(12) United States Patent
Amrine

(10) Patent No.: US 6,641,876 B2
(45) Date of Patent: Nov. 4, 2003

(54) IN-MOLD CONTAINER HAVING LABEL WITH INTEGRAL PEELABLE COUPON, LABEL HAVING INTEGRAL PEELABLE COUPON FOR IN-MOLD CONTAINER, AND METHOD OF MAKING SAME

(75) Inventor: Jeffrey S. Amrine, Roselle, IL (US)

(73) Assignee: Packaging Associates Corporation, Fox Lake, IL (US)

( * ) Notice: Subject to any disclaimer, the term of this patent is extended or adjusted under 35 U.S.C. 154(b) by 0 days.

(21) Appl. No.: 09/733,259

(22) Filed: Dec. 7, 2000

(65) Prior Publication Data

US 2001/0013391 A1 Aug. 16, 2001

Related U.S. Application Data

(63) Continuation-in-part of application No. 09/479,087, filed on Jan. 7, 2000, now abandoned.

(51) Int. Cl.[7] .............................. B32B 1/00; B65D 1/00; B42F 1/12
(52) U.S. Cl. .................................................. 428/34.1
(58) Field of Search ........................ 428/40.1, 43, 306, 428/35.7, 34.1; 283/81

(56) References Cited

U.S. PATENT DOCUMENTS

| | | | | |
|---|---|---|---|---|
| 2,725,790 A | * | 12/1955 | Bergstrom ..................... 89/1.7 |
| 2,956,612 A | * | 10/1960 | Gaines et al. ................. 154/1.6 |
| 4,345,393 A | * | 8/1982 | Price et al. .................... 40/312 |
| 4,468,912 A | * | 9/1984 | Lewis et al. ................... 53/137 |
| 4,479,838 A | * | 10/1984 | Dunsirn et al. ............. 156/247 |
| 4,872,707 A | * | 10/1989 | de Bruin ..................... 283/102 |
| 5,127,676 A | * | 7/1992 | Bockairo ....................... 283/81 |
| 5,172,936 A | * | 12/1992 | Sullivan et al. ................ 283/81 |
| 5,238,720 A | * | 8/1993 | Volkman ....................... 428/40 |
| 5,369,939 A | * | 12/1994 | Moen et al. ................... 53/485 |
| 5,409,754 A | * | 4/1995 | Yasuda et al. ................. 428/43 |
| 5,571,358 A | * | 11/1996 | Napier et al. ................ 156/227 |
| 5,776,284 A | * | 7/1998 | Sykes et al. ................. 156/252 |
| 5,807,619 A | * | 9/1998 | Freedman ................... 428/35.7 |
| 5,840,392 A | * | 11/1998 | Clark et al. .................. 428/40.1 |
| 5,851,333 A | * | 12/1998 | Fagnant et al. .............. 156/252 |
| 5,976,294 A | * | 11/1999 | Fagnant et al. .............. 156/192 |
| 5,976,655 A | * | 11/1999 | Sykes ......................... 428/40.1 |

FOREIGN PATENT DOCUMENTS

| | | | |
|---|---|---|---|
| EP | 0331841 | * | 9/1989 |
| JP | 08234664 | * | 9/1996 |

* cited by examiner

Primary Examiner—Harold Pyon
Assistant Examiner—Marc Patterson
(74) Attorney, Agent, or Firm—Michael Best & Friedrich LLC

(57) ABSTRACT

The present invention provides an in-mold container having a label with an integral peelable coupon, a method of manufacturing the in-mold container, and an in-mold label with an integral peelable coupon. The method of manufacturing an in-mold blow molded bottle having an in-mold label includes providing a parison; opening a mold having a cavity; picking at least one label having an integral peelable coupon thereon from a magazine; placing the label in the cavity; retaining the label in a predetermined position with a vacuum; closing the mold on the parison; blowing the parison into the mold to create a container; bonding the label to the container to create a peelable coupon container; and, opening the mold to release the peelable coupon container.

9 Claims, 5 Drawing Sheets

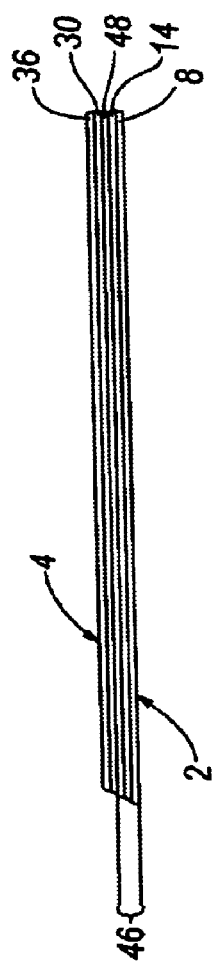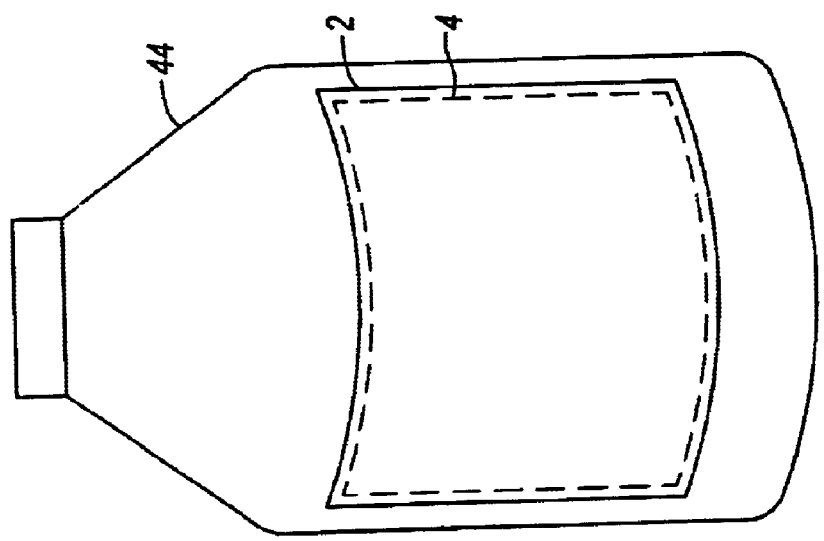

IN-MOLD CONTAINER HAVING LABEL WITH INTEGRAL PEELABLE COUPON, LABEL HAVING INTEGRAL PEELABLE COUPON FOR IN-MOLD CONTAINER, AND METHOD OF MAKING SAME

CONTINUATION-IN-PART PATENT APPLICATION DATA

The instant application is a continuation-in-part and claims priority to U.S. patent application Ser. No. 09/479,087, filed Jan. 7, 2000 now abandoned.

BACKGROUND OF THE INVENTION

This invention relates in general to new and useful improvements in the types of labels that are placed within molds in which containers and the like are to be blow molded, and more particularly, to an in-mold label having an integral peelable coupon, and in-mold labeling method and system for blow molds which are formed of two halves, and which open for the discharge of a container and the insertion of the labels having integral peelable coupons.

In-mold labeling systems for blow molds of the split half type in which the blow molds rotate in a circular pattern and open radially are commercially available. Such blow mold labeling systems are fixed on the carriage of the machine frame and when the blow molds are opened and immediately after the discharge of a blow molded article therefrom, label applicators are moved transversely into the path of the rotating blow molds for placing labels into one or both of the mold halves.

Various types of in-mold labeling systems are known in the art. By way of example, U.S. Pat. No. 5,925,208 to Dronzek and U.S. Pat. No. 5,266,149 generally relates to a process for the production of printed in-mold labeled molded containers. U.S. Pat. No. 5,916,646 to Baudin generally relates to a container and method of making a container that has a decorative label. U.S. Pat. No. 5,868,986 to Foulkes generally relates to an in-mold labeling system that uses film. U.S. Pat. No. 5,919,498 to Weber et al. generally relates to an apparatus for applying labels to blow-molded articles. U.S. Pat. No. 6,001,208 to Kinoshita et al. generally relates to a method for "in-mold" molding using a label.

However, all of the art methods and systems have a significant drawback in that they do not provide for the economical in-mold affixation of labels having peelable coupons integral therewith in a blow molded process.

It is an object of the invention to solve this and other problems in the art by providing a method of making a label having an integral peelable coupon, a method of manufacturing an in-mold blow molded bottle having an integral peelable coupon applied in-mold, and an in-mold container having a label with an integral peelable coupon.

SUMMARY OF THE INVENTION

The present invention provides a method of making a label having an integral peelable coupon. The method includes the steps of applying a topcoat to a face of stock to obtain topcoated stock; curing the topcoated stock; webbing the topcoated stock through a press; printing on the topcoated stock; applying pressure sensitive laminating adhesive to the topcoated stock to obtain adhesive coated stock; curing the adhesive coated stock; nipping the adhesive coated stock to a base web to obtain a pre-finished base web; printing on the pre-finished base web; and, top coating the pre-finished base web with a topcoat to obtain a peelable coupon base web.

The label having an integral peelable label is used in an in-mold method of manufacturing a blow-molded bottle having an in-mold label with an integral peelable coupon. The method of manufacturing the in-mold bottle includes the steps of providing a parison; opening a mold having a cavity; picking at least one label having an integral peelable coupon thereon from a magazine; placing the label in the cavity; optionally retaining the label in a predetermined position with a vacuum; closing the mold on the parison; blowing the parison into the mold to create a container; bonding the label to the container in-mold to create a peelable coupon container; and, opening the mold to release the peelable coupon container.

It is an object of the present invention also to provide an in-mold container having a label with an integral peelable coupon. In one variant, the label with an integral peelable coupon includes a printed, cured, topcoated stock layer. The topcoated stock layer has a cured, pressure sensitive, laminating, adhesive layer. The cured, pressure sensitive, laminating, adhesive layer is peelably connected to a base web. The base web has printing thereon and is optionally coated with a topcoat.

It is a further object of the invention to provide an in-mold container having a label with a printed, cured topcoated stock layer that includes a plurality of topcoats on a face of the stock layer. In a variant, the plurality of topcoats includes two topcoats. The two layers split leaving one layer on the face and leaving the other layer to deaden the pressure sensitive laminating adhesive layer. In another variant of the invention, the topcoat is a UV topcoat. The stock layer can be a Yupo™ in mold label ("IML") label or other label web. In another variant of the invention, the base web includes a UV pressure sensitive laminating adhesive, which may include a 15900™ UV pressure sensitive laminating adhesive. In another variant of the invention, the UV pressure sensitive laminating adhesive layer includes a tacky UV pressure sensitive adhesive.

In yet another variant, the invention provides a method of advertising using in-mold containers that consists of applying the label having an integral peelable coupon to the in-mold containers.

The objects and features of the present invention, other than those specifically disclosed herein, will become more apparent in the detailed description of the invention and drawings set forth below.

BRIEF DESCRIPTION OF THE DRAWINGS

FIG. 5 is a perspective view of a container with a label having an integral peelable coupon of the present invention; and, FIG. 6 is a cross-sectional view of the label having an integral peelable coupon of the present invention.

DETAILED DESCRIPTION OF THE INVENTION

Figure 1:
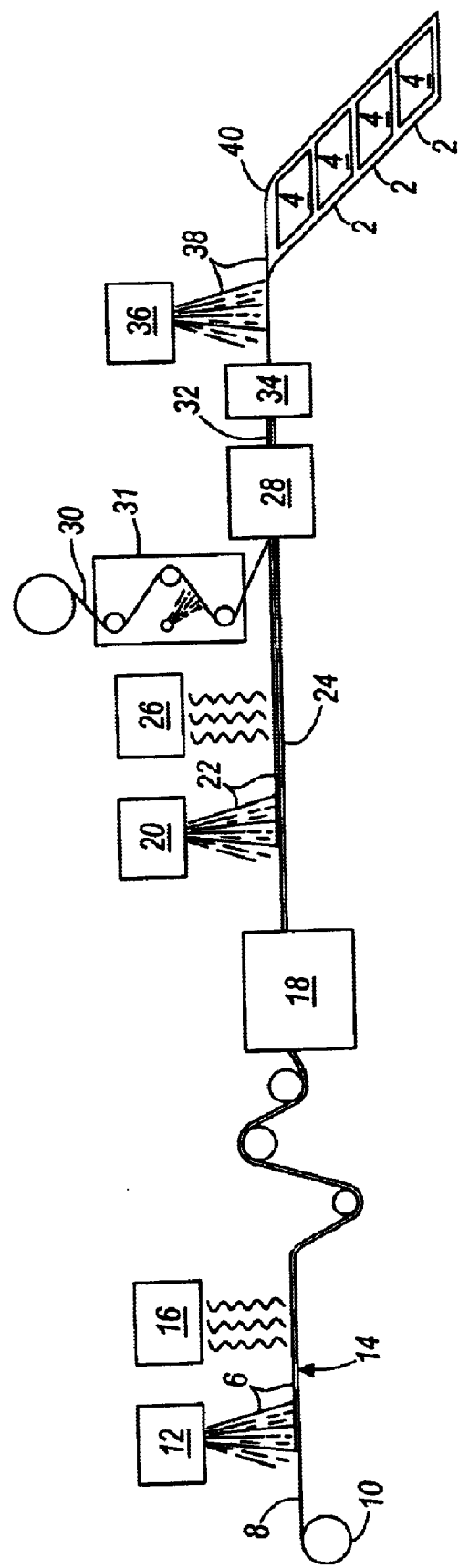
FIG. 1 is a schematic illustration of the method of making an in-mold label having a peelable coupon of the present invention.

FIG. 1 is an illustration of a method of making a label 2 having an integral peelable coupon 4. The method includes the steps of applying a topcoat 6 to a face 8 of stock 10 at topcoat applying station 12 to obtain topcoated stock 14. Topcoat stock 14 is then cured at curing station 16. The topcoat stock 14 is then webbed through printing press 18 for printing subject matter on topcoat stock 14. The topcoated stock 14 is then fed to adhesive application station 20 where pressure sensitive laminating adhesive 22 is applied to the topcoated stock 14 to obtain adhesive coated stock 24. The adhesive coated stock 24 is then fed to curing station 26 for curing the adhesive coated stock 24. The cured adhesive coated stock 24 is then fed to nipping station 28. The cured adhesive coated stock 24 is nipped to base web 30 to obtain a pre-finished base web 32. Base web 30 is optionally off-line coated and fed from unwind lamination station 31. In the present invention, web 8 and web 30 can meet on separate, synchronized rollers (not shown). Webs 8 and 30 are optionally eye marked and can be fed out at the same speed by single or multiple motor driven machines. The pre-finished base web 32 is then printed on at printing station 34. The pre-finished base web 32 is then fed to top coating station 36. At top coating station 36 pre-finished base web 32 is top coated with topcoat 38 to obtain peelable coupon base web 40.

Figure 2:
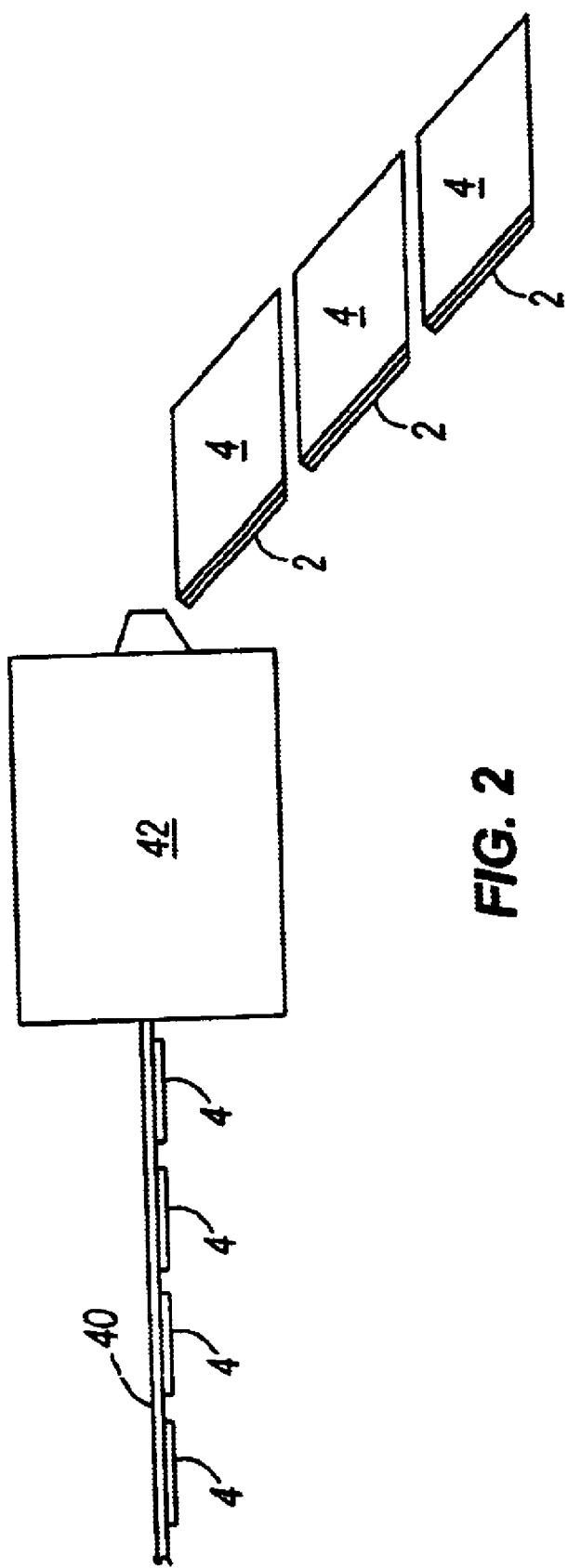
FIG. 2 is a schematic illustration of a portion of the method of the present invention.

It is appreciated that the method described above provides for the efficient sequential creation of a plurality of labels 2 having integral peelable coupons 4. In that regard, peelable coupon base web 40 comprises a plurality of labels 2 having integral peelable coupons 4. As illustrated in FIG. 2, the labels 2 with integral coupons 4 are then fed to cutting station 42. At cutting station 42, the plurality of labels having integral peelable coupons thereon are then cut to form a plurality of individual label/coupons by cutting the peelable coupon base web 40. In one variant of the invention, cutting station 42 comprises a die cutting station that die cuts the peelable coupon base web 40 to obtain a plurality of the labels 2 having an integral peelable coupons 4.

In another variant of the invention, topcoat applying stations 12, 36 can apply individual topcoats 6, 38 or multiple topcoats 6, 38 in series or by multiple sprayings as desired. Where desired, a plurality of topcoats 6 or 38 are applied to face 8 of stock 10. In a desired embodiment of the invention, the plurality of topcoats 6 or 38 comprise two topcoats to provide two layers of the topcoat 6 or 38. The two layers split leaving one layer on the face 8 and leaving the other layer to deaden the pressure sensitive laminating adhesive 22.

In one variant of the invention, topcoat 6 is a UV topcoat. However, the invention also contemplates the use of water-based topcoats or other conventionally available topcoats. In this scenario, UV curing stations can be eliminated or substituted with other types of curing stations. The stock 10 is a Yupo™ IML label in one embodiment. The invention does contemplate using TM other stock material than Yupo™ IML labels as appropriate.

In yet another version of the invention, a separate station (not shown) may be used in the step of applying topcoat 6 or 38 such that a second topcoat is applied to stock 10 in a separate coating procedure off-line from the initial topcoat 6 or 38. The various applications described in the invention can be effected utilizing a 360 line 5.4 BCN anilox device conventionally known in the art. The step of curing topcoated stock 14 or other processed stock described herein can be effectively accomplished with a lamp providing in the range of about 1 to about 300 watts/inch, while feeding the topcoated stock 14 at a rate of about 220 feet/minute. Of course, it is appreciated that other curing devices can be used in the invention with effective parameters to effect the curing being varied as desired as a function of the material being processed.

In one version of the invention, the base web 30 comprises UV pressure sensitive laminating adhesive 22. Adhesive 22 can be 15900™ UV pressure sensitive laminating adhesive commercially available from Northwest Coatings Corp., 7221 S. 10$^{th}$ Street, Oak Creek, Wis. 53154. If a UV adhesive is used, it can be cured as described in the present invention utilizing a 250 line 8.1 BCM at about 170 feet/minutes using in the range of about 1 watt/inch to about 300 watt/inch lamp. Optionally, the UV pressure sensitive laminating adhesive 22 comprises a tacky UV pressure sensitive adhesive. Also, a UV adhesive deadener and deadener application station having reduced amounts of silicone can also be used herein so that better adhesion is provided.

The step of applying UV topcoat 6 to a face 8 of stock 10 is effected in one variant at an effective coating weight in the range of about 0.1 mil to about 0.3 mil. It is appreciated that the effective coating weight can be in a range higher or lower than that described herein. The coating range depends on the substrate materials used and also the coating materials used and can be empirically determined. The step of applying UV pressure sensitive laminating adhesive 22 to the topcoated stock 14 to obtain adhesive coated stock 24 can include applying the UV pressure sensitive laminating adhesive at a coating weight in the range of about 0.1 mil to about 0.3 mil. The step of curing topcoat 6 can be effectively accomplished at a feed speed in the range of an effective speed that can be empirically determined, and the step of curing the adhesive coated stock 24 can include curing the adhesive coated stock 24 in an effective range.

Optionally, pre-finished base web 32 can also be top-coated off line. The pre-finished base web 32 is topcoated with a UV topcoat to obtain a peelable coupon base web 40. The pre-finished base web 32 is coated at a coating weight in the range of about 0.1 mil to about 0.3 mil. Optionally, an additional step of applying a controlled coefficient of friction ("C.O.F.") topcoat is also provided such that proper processing during in-mold production is facilitated. In one variant the C.O.F topcoat is applied on the face 8 stock.

Figure 3:
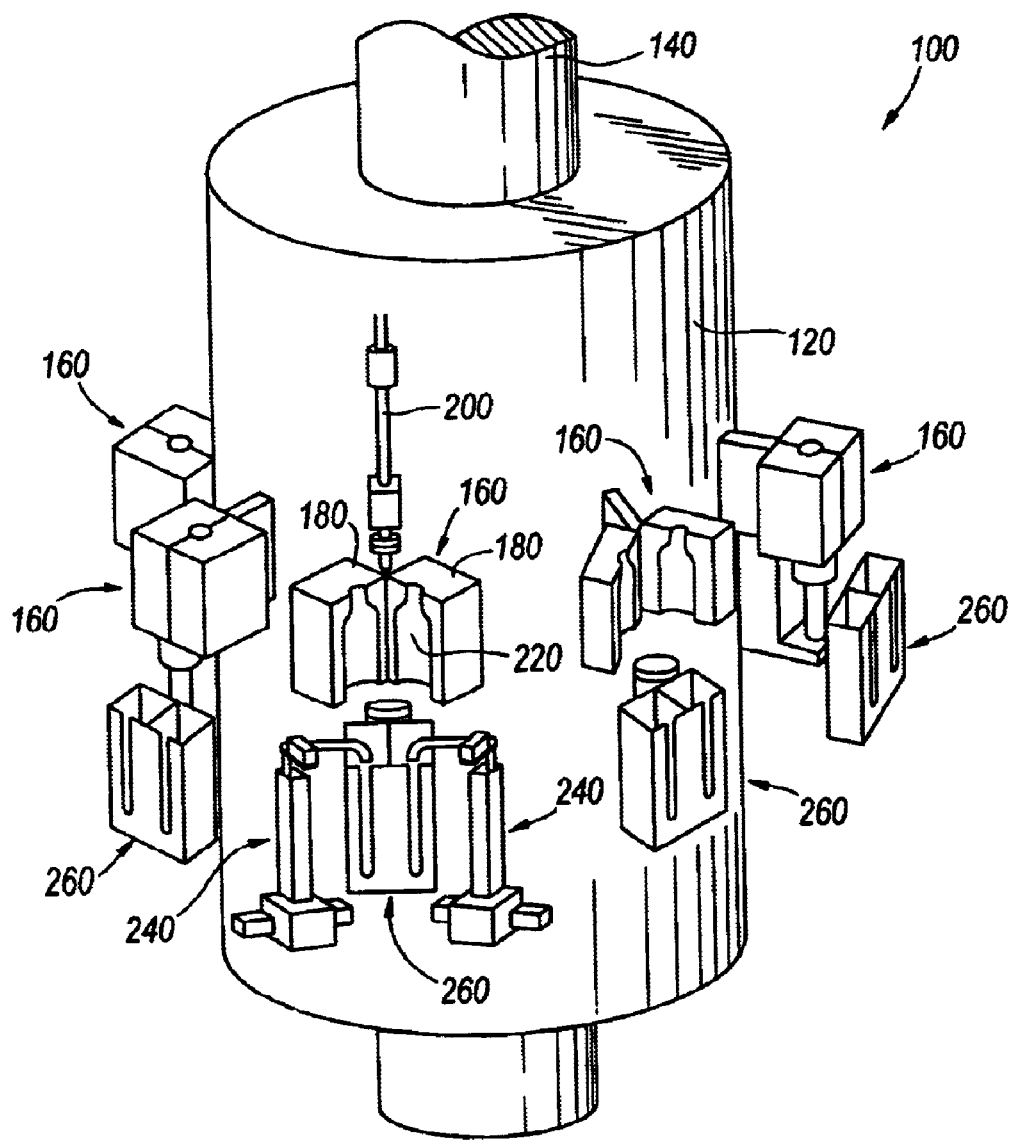
FIG. 3 is a schematic perspective view of a rotary blow molder and shows the blow molder provided with in-mold labeling assemblies to be used with labels having integral coupons of the present invention.

As illustrated in FIG. 3, the invention also includes a method of making an in-mold container 44 using a conventional rotary blow molder 100. Of course, other types of blow molders are used with the present invention and the invention is not limited to a rotary blow molder as shown in FIG. 3. The method includes affixing the label 2 with peelable coupon 4 made by the method described above to an in-mold container 44 (FIG. 6).

FIG. 3 illustrates a conventional rotary blow molder 100. Blow molder 100 includes a hub or turret assembly 120, which is mounted on a rotating vertical shaft 140. The turret 120 carries a plurality of blow mold sets 160 with each set 160 including two blow mold halves 180 which are optionally pivotally mounted for opening and closing.

The conventional machine 100 receives a preform or parison (not shown) and is then closed on the preform or parison, after which a stretch rod/stuffer assembly 200 is moved down into the preform or parison so as to simultaneously axially stretch the preform or parison and direct high pressure gas into the preform or parison to effect blow molding of the preform or parison to match a typical blow mold cavity 220.

The blow molder 100 is used, in one variant of the invention, to effect the method described herein. This invention utilizes an in-mold labeling system generally identified by the numeral 240. The in-mold labeling systems are automatically operated to remove one or more labels 2 having a peelable coupon 4 or other form of peelable material (e.g. advertising material, a duplicate label to label 2, both labels have identical or substantially identical graphics thereon) from a label magazine 260 and placing a label 2 having a coupon 4 or a plurality of labels 2 having a plurality of integral coupons 4 in respective cavities 220.

Figure 4:
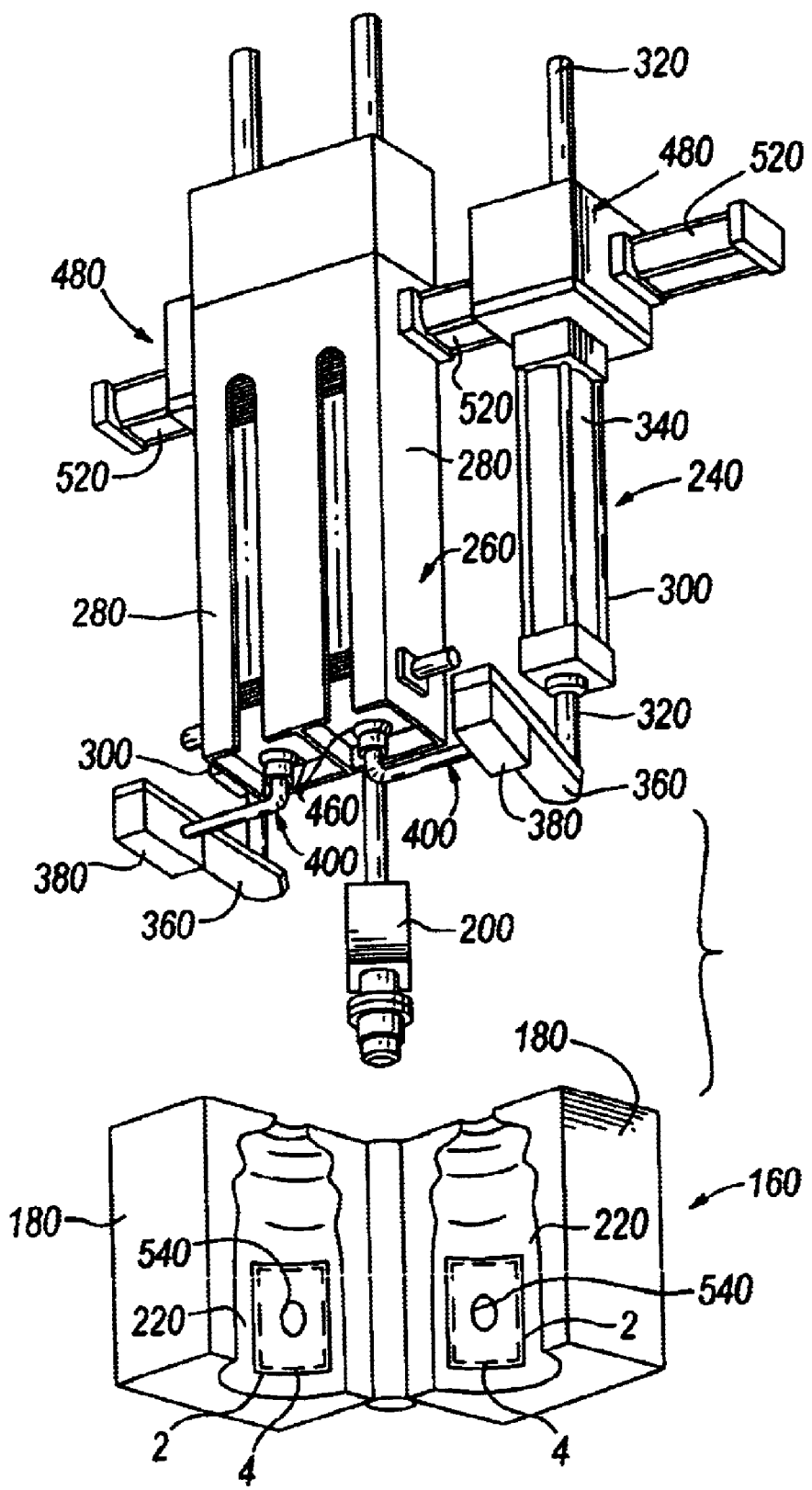
FIG. 4 is a schematic perspective view of a portion of an in-mold labeling system that is used in the present invention.

As shown in FIGS. 3 and 4, for each blow mold set 160 there is a magazine 260 and the magazine 260 is vertically disposed generally in alignment with blow mold set 160. Magazine 260 has disposed therein a plurality of labels 2 having integral peelable coupons 4 that have been die cut from peelable coupon base web 40 as described herein. The magazine 260 (FIGS. 3 and 4) may be provided with two vertically disposed label-receiving compartments 280 in which labels 2 are stored in stacked relation. The magazine 260 is generally of a conventional structure and is provided with suitable means for maintaining the uppermost label 2 at a predetermined fixed height.

A separate in-mold labeling system 240 is disposed at each side of the magazine 260 (FIG. 3). Each labeling system 240 includes a vertically disposed extensible fluid motor 300 which includes an elongated piston rod 320 that extends through cylinder 340 of fluid motor 300. The piston rod 320 can be in the form of a support shaft.

The upper end of the piston rod or support shaft 320 is provided with a transverse arm 360 on which there is mounted a rotary mounting unit 380 that supports a pickup arm 400 for limited rotation. Pick up arm 400 is used to position a label 2 having an integral peelable coupon 4 thereon in a predetermined position in cavity 220 as shown in FIG. 4. Pickup arm 400 is generally of L-shaped configuration and includes an elongated shaft portion 420 which may be horizontally disposed and which is carried by the rotary mount 380. The pickup arm 400 also includes an end portion which is disposed at right angles to the shaft portion 420 and carries a suction cup 460. The suction cup 460 uses a vacuum to temporarily grab coupon 4 of label 2 as it places it in cavity 220 on half 180. It is appreciated that in this method the label 2 is not directly held in direct contact with mold halves 180. Rather, the suction force is applied to coupon 4, and hence to label 2 indirectly when the label/coupon combination is placed in the mold halves 180. The label 2 is directly suctioned when grabbed by suction cup 460. Furthermore, it is appreciated that since label 2 with integral coupon 4 is comprised of multiple webs of material it is generally stiffer than label 2 alone or coupon 4 alone providing for more ease of retention by suction cup 460 or suction or vacuum mechanism 540, and is more easily held in place and positioned by suction cup 460 than either the label 2 alone or the coupon 4 alone.

While the fluid motor 300 serves to axially move the support shaft 320, the support shaft 320 is also mounted for rotary movement. The rotation of the support shaft 32 is controlled by a drive unit generally identified by the numeral 480. The rotary drive unit 480 includes a housing on which there is mounted a pair of horizontally disposed, aligned, extensible fluid motors 520.

It is appreciated that in-mold labeling systems 240 and the magazines 260 are suitably secured to the turret 120 for rotation therewith and are generally fixed relative to the associated mold sets 160 in this embodiment of the invention. Utilizing the system 240 of FIGS. 3 and 4, it is possible to effect the method of the present invention. It will be appreciated that a rotary device is not critical to the present invention and any type of blow molding device can be used to effect the method described herein. The device described herein is simply an exemplary device that can be employed to effect the method.

The method of manufacturing an in-mold blow molded bottle or container 44 having an in-mold label 2 having an integral peelable coupon 4 includes providing a parison or preform (optionally to mold cavity 220); opening a mold or mold half 180 having a cavity 220; picking at least one label 2 having an integral peelable coupon 4 thereon from magazine 260; placing the label 2 in the cavity 220 (FIG. 4); retaining the label 2 in a predetermined position with an optional vacuum 540; closing mold halves 180 on the parison; blowing the parison into the mold 160 to create a container 44; bonding the label 2 to the container to create a peelable coupon container 44; and, opening the mold 160 to release the peelable coupon container 44.

FIG. 5 illustrates an in-mold container 44 having a label 2 with an integral peelable coupon 4. The in-mold container 44 has label 2 with an integral peelable coupon 4 that is manufactured by the method of as described in FIG. 1.

As shown in FIGS. 5 and 6, the in-mold container 44 has label 2 with an integral peelable coupon 4. Label 2 with integral peelable coupon 4 includes a printed, cured, topcoated stock layer 46. The topcoated stock layer 46 has a cured, pressure sensitive, laminating, adhesive layer 48. The cured, pressure sensitive, laminating, adhesive layer 48 is releaseably connected to base web 30. As described previously, base web 30 has printing (e.g. graphics and trademarks) thereon and is coated with a topcoat. It is appreciated that stock 10 is permanently adhered to container 44, while coupon 4 is only releaseably connected to stock 10.

Optionally, printed, cured topcoated stock layer 46 can include a single or a plurality of topcoats applied to face 8 of stock layer 10 (FIG. 1). In one variant of the invention, the plurality of topcoats 6 includes two topcoats to provide two layers of topcoat. The two layers split leaving one layer on the face 8 and leaving the other layer to deaden the pressure sensitive laminating adhesive layer 22 applied at station 20.

In one variant of the invention, base web 30 is printed, appropriately coated off-line and fed to nipping station 28. In another variant of the invention, layer 22 is applied base web 30, alone, instead of being applied to stock 8. In another variant of the invention layer 22 is applied to both the base web 30 and stock 8. As described above, the UV pressure sensitive laminating adhesive 22 layer comprises 15900™ UV pressure sensitive laminating adhesive 22 commercially available from the vendor identified above. In another variant of the invention, the UV pressure sensitive laminating adhesive layer 22 comprises a tacky UV pressure sensitive adhesive and/or a UV adhesive deadener layer having reduced amounts of silicone, whereby better adhesion is provided. In another aspect the invention provides a method of advertising using in-mold container 44. The method includes applying the label 2 having a peelable coupon of claim 1 to the in-mold container 44. Even though, base web 30 is described as a coupon 4 after processing, it is appreciated that it does not necessarily have to be a coupon but may include any type of printed matter, including but not limited to, a duplicate of a product label that is also printed on stock 8. In this variant, it is contemplated that a user first sees the upper most web having the product label thereon when encountering container 44, he peels away duplicate product label 4 (which optionally on its underside has a coupon or other printed matter). It is appreciated that after the product label 4 is peeled away base stock has an identical duplicate or a substantial duplicate of the matter printed on the front of product label 4. In this way, the manufacturer retains any trademark matter or other graphic matter on the container 44 even after the label/coupon 4 has been removed from the container 44.

It is further appreciated that in one variant the particular pressure sensitive adhesive 22 selected will depend upon the characteristics of the container 44 and will be an adhesive suitable for use with various products. A useful type of adhesive 22 is a dry residue adhesive that is an ethylene vinyl acetate copolymer latex. An example of such an adhesive is an aqueous dispersion containing approximately 60% solids by weight, comprising approximately 22.4% ethylene and 77.6% vinyl acetate, and preferably including a cross-linking agent and potassium peroxide or other inorganic peroxide.

It is appreciated that the method as shown in FIG. 1 will unite all of the various layers of label/coupon 2/4 during one automated process so that the combination can provide for an easy one step production of labels 2 having integral peelable coupons 4 and/or attachment to a container 44 in system 100. In the method of FIG. 1, there is a synchronization mechanism (not shown) so (optionally) pre-printed coupon web 30 and (optionally pre-printed) web 8 contact. All webs are nipped and congruent with respect to graphics on each layer to facilitate presentation of the graphics if foil, plastic, or paper stock is used.

A flexographic printing press can be used as press 18 and/or 34 of the present invention (FIG. 1). It is appreciated that the various method steps described herein can be located at different stations and that the stations needed not be successively provided as shown in the figures. The printing can be done on a flexographic printing machine off-line or on-line as required. This type of machine is commercially available from Apex Machine Company of Ft. Lauderdale, Fla. Cutting station 42 and/or station 31 can include a slitter device (not shown) or perforating die on the press for die cutting appropriate shapes of labels 2 to fit a particular container or cup. Slitter devices and perforating devices are commonly known in the industry. Hence, it is appreciated that coupon 4 can be provided with a single or multiple coupons or coupon strips. An exemplary slitter device is a machine produced by Crown Machine Division, Inc. of Chicago, Ill.

It is appreciated that the dry release adhesives described herein, having a predetermined adhesive strength, leave no sticky residue when the consumer peels coupon 4 from label 2. The dry release adhesive can be substantially transparent when applied and can only be sticky when it first adheres. After a consumer removes coupon 4, the dry release adhesive becomes non-tacky.

In other parts of the invention, the containers 44 are optionally filled with food, food products, laundry detergents or other household or industrial goods, and capped.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A blow molded container having a plastic label with a peelable coupon that is attached to said container while it is being formed in a blow mold, said combination of plastic label and peelable coupon comprising:

a plastic stock coupon web, having graphics and a cured topcoat layer thereon;

a curable pressure sensitive laminating adhesive coating over said graphics on said topcoated plastic stock web, said adhesive having an adhesive strength which survives blow holding and which separates to release said coupon from said label responsive to an application of a peeling force thereto;

a base plastic label web;

a laminated wet comprising said plastic stock coupon web adhered to said base plastic label web by said adhesive; and said laminated web being cut into said combinations of individual labels with said individual coupons thereon.

2. The container of claim 1 in which said cured topcoat layer further comprises a plurality of topcoats applied to a face of said plastic stock coupon web.

3. The container of claim 2 in which said plurality of topcoats comprises two topcoat layers, said two layers being separate from each other leaving one layer on said face and leaving the other layer to release the pressure sensitive adhesive layer.

4. The container of claim 2 in which said topcoat is an ultraviolet cured adhesive topcoat.

5. The container of claim 2 in which said base plastic label web comprises an ultraviolet cured pressure sensitive adhesive layer.

6. The container of claim 5 in which said ultraviolet cured pressure sensitive adhesive layer comprises a tacky ultraviolet cured adhesive.

7. The container of claim 1 in which said label further comprises an ultraviolet cured adhesive deadener layer having silicone.

8. The container of claim 5 in which said ultraviolet cured pressure sensitive adhesive layer has a thickness in the range of about 0.1 mil. to about 0.3 mil.

9. The container of claim 1 in which said base web has a coating in the range of about 0.3 mil. to about 0.6 mil.

* * * * *